Sept. 29, 1942.  J. KANTOR  2,297,154
BEVERAGE MIXER
Filed Jan. 6, 1939  5 Sheets-Sheet 1
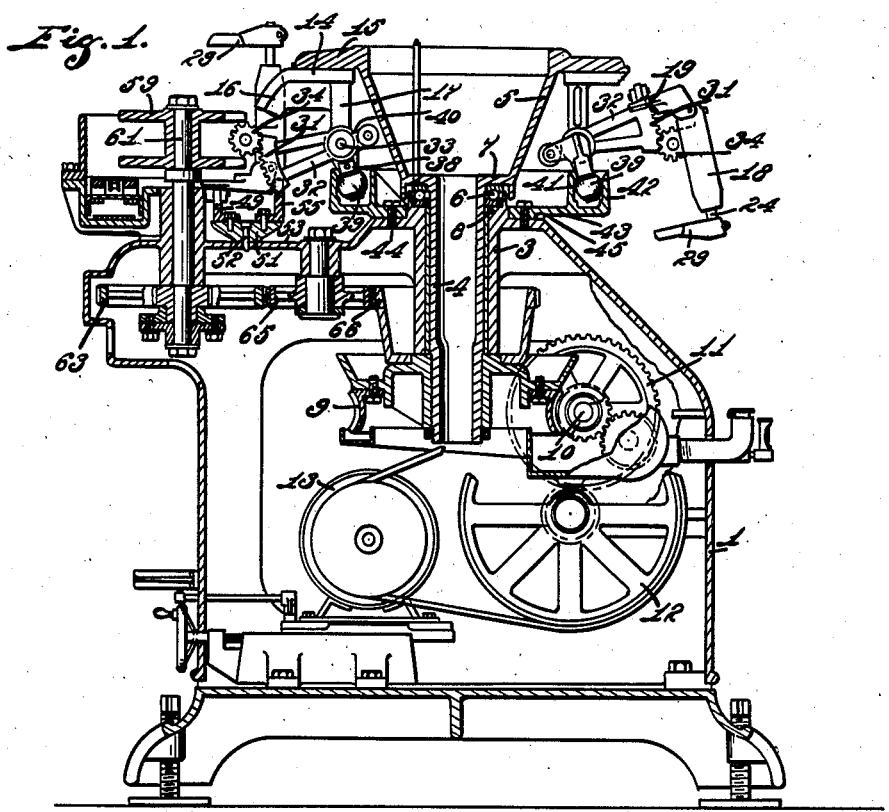
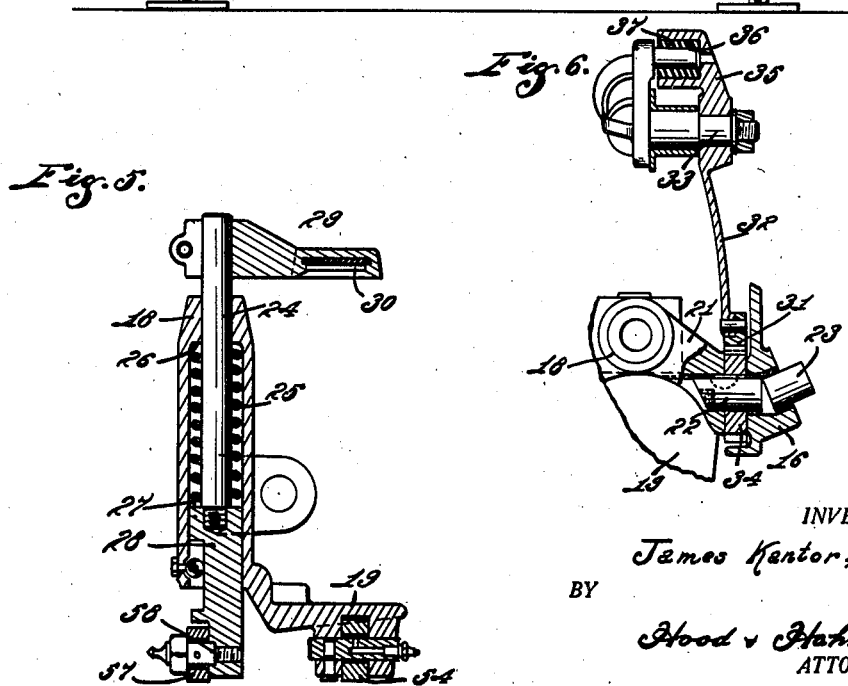
INVENTOR.
James Kantor,
BY
Hood & Hahn.
ATTORNEYS.

Sept. 29, 1942. J. KANTOR 2,297,154
BEVERAGE MIXER
Filed Jan. 6, 1939 5 Sheets-Sheet 2
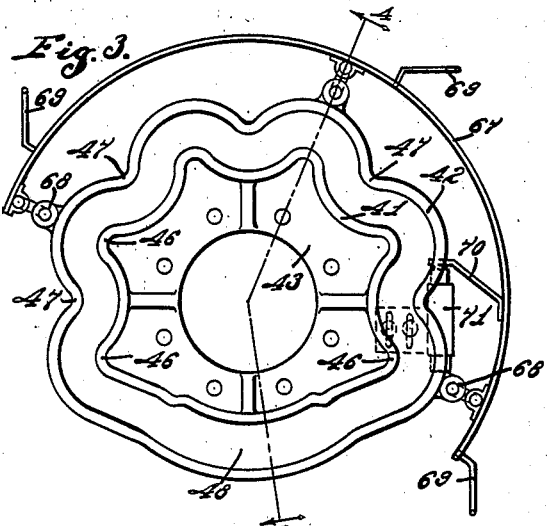
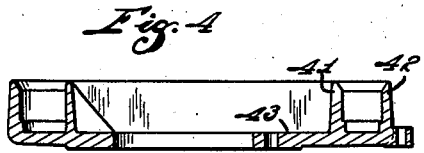
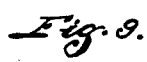
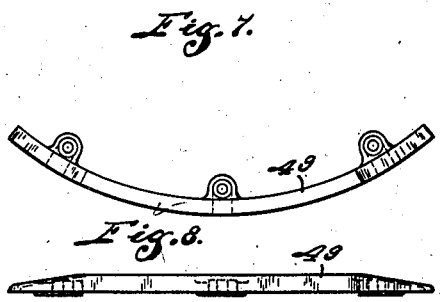
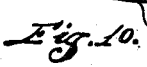
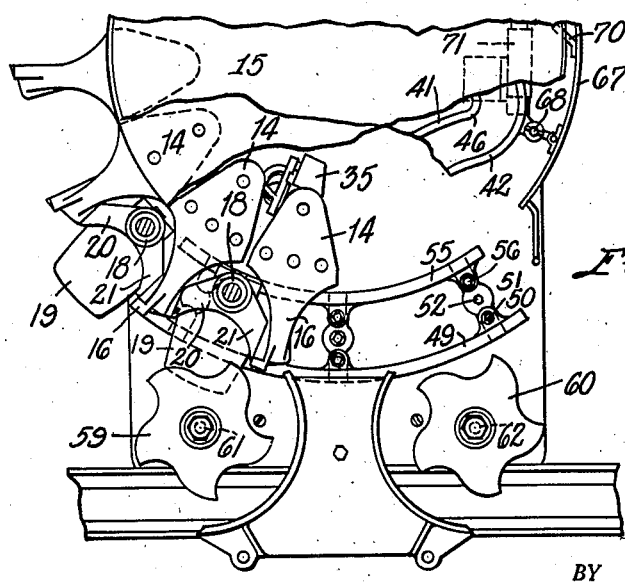
INVENTOR.
James Kantor,
BY
Hood & Hahn.
ATTORNEYS.

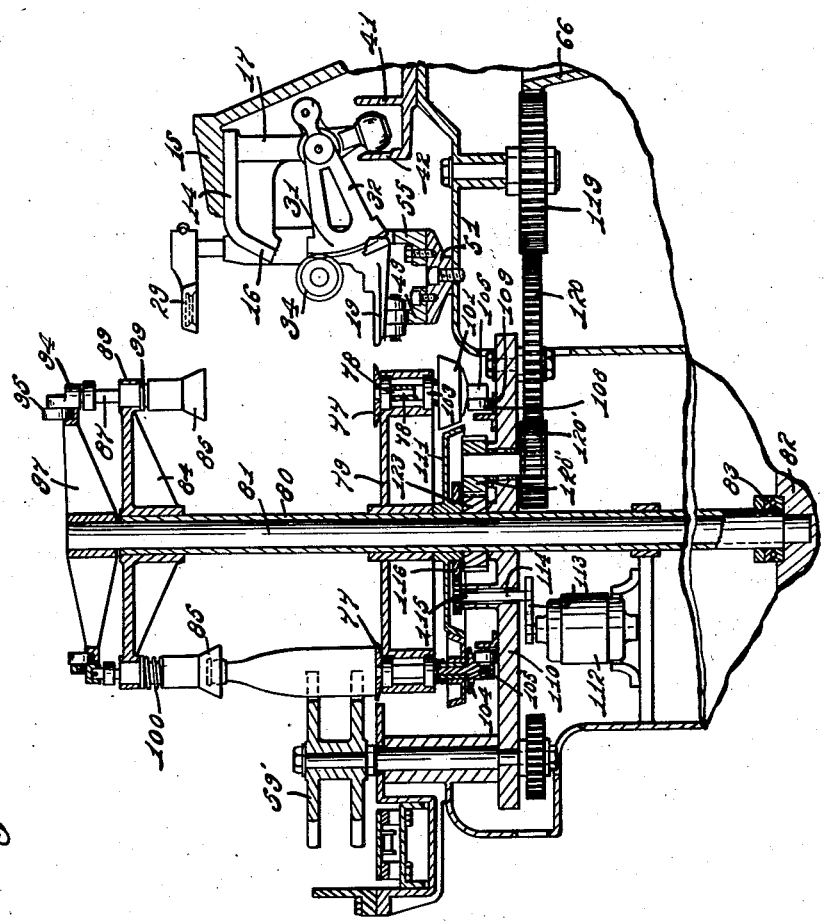

Sept. 29, 1942.    J. KANTOR    2,297,154
BEVERAGE MIXER
Filed Jan. 6, 1939    5 Sheets-Sheet 4

INVENTOR.
James Kantor,
BY
Hood & Hahn.
ATTORNEYS.

Sept. 29, 1942.                J. KANTOR                2,297,154
                            BEVERAGE MIXER
                         Filed Jan. 6, 1939            5 Sheets-Sheet 5
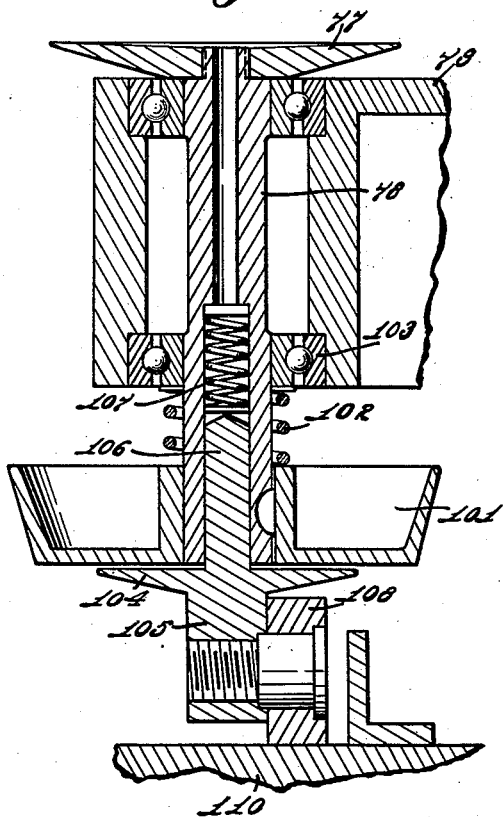
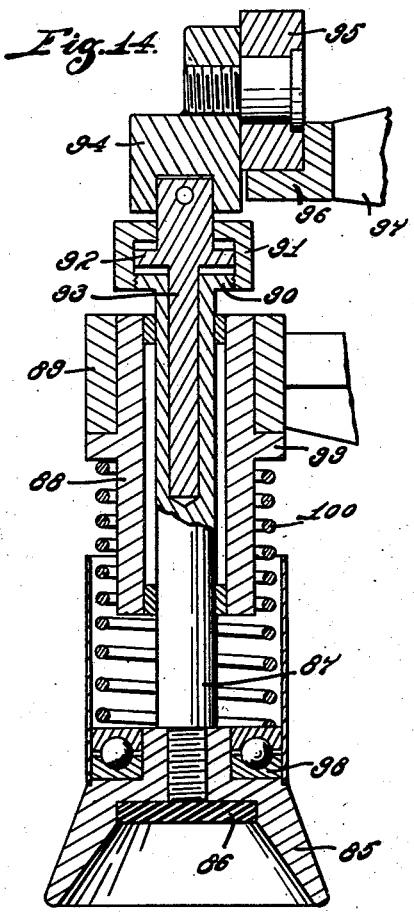
INVENTOR.
James Kantor,
BY
Hood + Hahn
ATTORNEYS.

Patented Sept. 29, 1942

2,297,154

UNITED STATES PATENT OFFICE 2,297,154

BEVERAGE MIXER

James Kantor, Chicago, Ill., assignor to The Liquid Carbonic Corporation, Chicago, Ill., a corporation of Delaware Application January 6, 1939, Serial No. 249,569

22 Claims. (Cl. 25—54)

My invention relates to improvements in beverage mixing machines.

In the bottling of carbonated beverages, it is the usual custom to deposit in the bottle a predetermined quantity of flavored syrup and afterwards fill the bottle with carbonated water, after which the bottle is sealed in the usual manner. As a result of this filling process, the syrup generally lies in the bottle in one stratum, with the carbonated water lying on top thereof in another stratum. In order to mix the syrup and water, various methods have been resorted to for agitating the bottle. The not unusual manner of agitating the bottle is for the operator, as the bottle comes off of the conveyor from the filling machine, to shake the bottle. In order to improve on this manner of agitating the bottle, various machines, now in commercial use, have been developed for agitating the bottle. Certain of these machines agitate the bottle by either completely rotating the bottle on an axis intermediate of the top and bottom thereof or of oscillating the bottle on an axis intermediate of the top and bottom thereof.

My present invention relates to improvements in that type of mixing machine wherein the bottle is adapted to be oscillated on an axis passing through approximately the center thereof and it is one of the objects of my invention to provide a machine which, within a limited floor space, will provide means whereby the bottle will be rapidly oscillated a large number of times between the reception of the bottles in the machine and the delivery of the agitated bottle on the outside of the machine.

In certain types of bottled beverages wherein the syrup itself is cold and wherein the carbonated water likewise is chilled, it has been found that, in order to thoroughly mix the syrup and water, it is necessary to impart a rapid oscillation to the bottle in order to help throw the liquid in the bottom of the bottle towards the top of the bottle to thereby cause a thorough mixing.

My present machine is particularly adapted for imparting to the bottle, in its oscillations, a "snap action" and is particularly designed for imparting a large number of oscillations to the bottle by means of a mechanism which occupies a minimum of floor space.

Furthermore, I have found that there is a tendency for at least a film of syrup to adhere to the sides of the container which will continue to adhere to the sides of the container even though the container itself is violently agitated and even though the container is rapidly oscillating. I have found, however, that this film can be broken loose from the sides of the bottle by rapidly spinning the bottle on its vertical axis and if after the bottle has been spun and the liquid in the bottle set in motion by this spinning action, the bottle is then oscillated or agitated, the syrup will be thoroughly and intimately mixed with the carbonated water and there will remain no undiluted particles of syrup in the container.

It is therefore one of the objects of my present invention to provide means for setting up a spinning movement of the contents of the container and to agitate or oscillate the container while the contents of the container continues to spin.

For the purposes of disclosing my invention, I have illustrated an embodiment of the same in the accompanying drawings, in which:

Fig. 1 is a longitudinal sectional view of the bottle oscillating mechanism;

Fig. 2 is a partial plan view thereof;

Fig. 3 is a detail plan of the oscillating cam;

Fig. 4 is a sectional view of the oscillating cam;

Fig. 5 is a longitudinal sectional view of the bottle clamping mechanism of the agitating machine;

Fig. 6 is a detail of the oscillating mechanism;

Figs. 7 and 8 are respectively plan and side elevations of the cams for maintaining the bottle support of the agitator in substantially horizontal position;

Figs. 9 and 10 are respectively a plan and side elevation of the holder releasing cam;

Fig. 11 is a partial longitudinal section of the combined spinner and agitating mechanism;

Fig. 13 is an enlarged sectional view of the bottle spinner support; and

Fig. 14 is an enlarged sectional view of the bottle spinner clamp.

Figure 12:
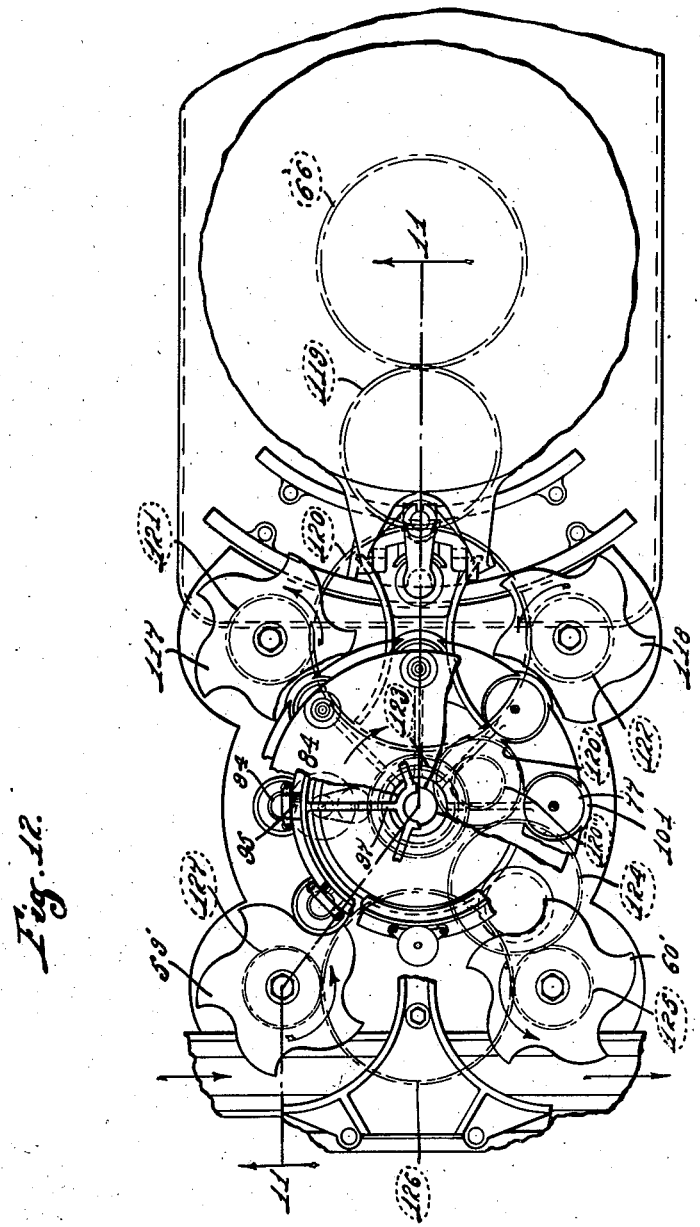
Fig. 12 is a partial plan view thereof.

The oscillating mechanism may in itself comprise a complete unitary structure although I have found that the same operates more advantageously in combination with the spinning mechanism. To this end, therefore, I have illustrated in Figs. 1 to 10 the oscillating mechanism as a unit and in the unit structure illustrated in the accompanying drawings, there is provided a suitable housing base 1. This housing base provides a support for the operative parts of the mixer and provides an enclosing housing for the drive mechanism thereof. The housing is provided with a preferably integral downwardly extending sleeve 3 within which is adapted to be rotatably mounted the hollow shaft portion 4 of a spider head 5. This spider head is supported on ball bearings 6 interposed between a shoulder 7 on the head and a shoulder 8 on the base 1.

The spider head is rotated from a suitable drive mechanism and to this end the lower end of the hollow shaft 4 is provided with a worm gear 9 adapted to mesh with a worm on a drive shaft 10 suitably driven through an intermediate gear train 11 from a drive wheel 12 having a belt drive connection with a suitable power element 13. A plurality of oscillating holders, in the present machine fifteen in number, are supported from the spider head 5. Each one of these holders is of identical construction and it is, therefore, necessary only to describe one thereof. For supporting the holders, I provide a plurality of brackets 14 which are suitably spaced apart and are bolted to the under side of the annular flange 15 on the spider 5. Each of these brackets is provided with two arms 16 and 17, one of which, the arm 16, being adapted for cooperation with the corresponding arm on the next adjacent bracket for supporting the bottle holder. The other arm 17 is adapted to support the oscillating cam roller which will be more full described hereinafter.

Each of the bottle holders comprises a hollow sleeve 18 having laterally extending from the bottom thereof a supporting platform 19 adapted to receive and provide a support for the bottle, when the bottle is in its upright position, and one member of the pair of clamping members when the bottle is positioned for oscillation. This sleeve has extending from each side thereof a point approximately intermediate of its top and bottom, a pair of supporting arms 20 and 21 adapted to fit between the arms 16 of a pair of adjacent brackets 14. The arm 21 is adapted to receive a bearing pin 22 extending from an arm of one bracket and the arm 20 is adapted to receive a bearing pin 23 extending from the adjacent bracket so that the support is rotatably mounted between a pair of the supporting brackets 14 in a position to oscillate radially relatively to the supporting spider 5 as the same is rotated on its axis.

Extending through the sleeve member 18 of the bottle holder or support is a vertically movable rod 24 biased downwardly through the instrumentality of a coiled spring 25 interposed between an internal shoulder 26 on the sleeve 18 and a shoulder 27 on an operating member 28 extending through the bottom part of the housing. This rod 24 is provided, at its upper end, with a clamping arm 29 having a socket 30 adapted to receive the neck of the bottle. Due to the action of the spring 25, when the spring is permitted to become active, the clamping arm 29 will be drawn downwardly or toward the platform 19 to thereby securely clamp the bottle in position between the arm 29 and the platform.

For oscillating each one of the bottle holders, I provide a gear segment 31 which is mounted on one end of an arm 32 in turn pivotally mounted on the bracket arm 17 through the medium of a pivot pin 33. This gear segment 31 meshes with a gear 34, in turn keyed on the pivot pin 22 which, it will be remembered, is rotatably mounted in the arm 16 of the bracket 14, and is likewise keyed to the arm 21 so that, as this pivot pin rotates, the bottle holder will be oscillated therewith. The arm 32 is provided with an extension 35 having a pin-receiving opening 36 adapted to receive a rubber bushing 37. A cam roller arm, preferably in the form of a bell crank lever, is also mounted on the pin 33 and one arm 38 carries at its end a cam roller 39. The opposite arm 40 is provided with a pin adapted to take into the pin-receiving opening 36 of the arm 35 so that any oscillating movement imparted to the arm 38 will in turn be imparted to the arm 32, thus reciprocating or oscillating the rack 31 and in turn transmitting a rotarily oscillating movement to the gear 35.

For imparting an oscillating movement to the arm 38, I provide a cam track consisting of the two spaced apart track members 41 and 42 extending upwardly from a plate 43 surrounding the spider 5 and bolted as by bolts 44 to the top surface 45 of the housing 1. The configuration of this cam track is better illustrated in the plan view thereof wherein, as is shown, there is provided six "high" points 46 so that, as the spider rotates, carrying with it the oscillating arm 38, this arm will be moved outwardly six times and inwardly five times by the "high" points 47 on the track member 42. There is also provided a comparatively long curved stretch 48 between the two track members and it will be seen that this curved stretch takes place after the arm 38 has been moved to its innermost position, at which position, the sleeve 18 is in a vertical position with the platform 19 horizontally disposed. In this "straight" run 48, the track sections 41 and 42 are spaced somewhat wider than the remaining sections.

Coincident with this "straight" run section 48, I provide, beneath the platform 19, a cam member 49 which is bolted through suitable bolts 50 to cam support arms 51 in turn bolted by the bolts 52 to the top portion 53 of the housing. This cam 49 is adapted to be engaged by a roller 54 on the underside of the platform 19 and during the period that the cam portion 49 is engaged by this roller, the platform 19 is maintained in its horizontal position and prevented from being tilted.

It is to be noted that during this period, due to the configuration of the portion 48 of the cam tracks, the arm 38 remains quiescent.

A second cam 55 is also mounted on the cam supports 51 through the medium of bolts 56 and this cam is in a position to be engaged by a roller 57 mounted on a pin 58 extending transversely to the slide member 28 to which the rod 24 is secured. This cam is sufficiently high so that as the roller 57 engages the same, the rod 24 will be moved upwardly, thereby elevating the clamping arm 29 and releasing the bottle. As soon, however, as the roller passes off of the cam, the arm 29 will be released, permitting the spring to draw the same downwardly in clamping position upon the bottle which has been deposited upon the platform 19. Also, as soon as the roller 54 passes off of the cam 49, the bottle holding device will be free so that it may be oscillated by the oscillating mechanism heretofore described.

The bottles, as they are delivered to the machine by a suitable conveyor mechanism located adjacent the machine, are transferred to the platforms 19 by infeed stars 59 and after having been agitated are removed from the platforms 19 by outfeed stars 60. These stars are respectively mounted on shafts 61 and 62, supported in the housing base 1 and they carry, at their lower ends, respectively, driving gears 63 and 64 adapted to mesh with the driving gear 65, in turn driven from a driving gear 66 carried on the hollow shaft 4 of the spider 5 so that all of the parts will be driven from a common drive and will be operated in unison.

As has heretofore been explained, the spider 5 and its associated parts are continuously driven from a suitable drive 13 which, in the present instance, is an electric motor. If, for any reason, the oscillating mechanism for the bottle holders should become broken, as, for instance, the segment rack or the driving gear, the inverted bottles would continue to rotate, striking portions of the machine and materially injuring not only the bottle holders but the rest of the machine. In order to prevent such an accident, I provide a shut-off mechanism which consists of a stop ring 67 which is hingedly supported by hinged members 68 from the cam plate. This stop ring is provided with a plurality of radially projecting slightly inclined fingers 69 spaced on the ring and in such position that, if the bottles are not raised by the oscillating mechanism at the proper intervals, they will be struck by the bottle as it rotates with the spider, thereby slightly rotating the stop ring 67. This stop ring carries a striker arm 70 adapted, when the ring is rotated, to operate a suitable switch 71 controlling the circuit through the electric motor driving the machine so that, upon the rotation of the stop ring and the movement of the striker arm 76, the switch 71 will be manipulated to open the circuit of the electric motor, thereby instantly stopping the machine.

Referring now to the structure illustrated in Figs. 11 and 12, the bottle spinning mechanism is provided as a unit cooperating with the agitating mechanism, heretofore described. This spinning mechanism is provided with a plurality of spinner platforms 77 mounted on the vertically extending shafts 78 in turn supported upon a disc-like platform 79. This platform 79 is secured to and rotates with a vertically extending sleeve 80 surrounding a vertically extending shaft 81. The shaft 81 is seated at its lower end in the base 82 of the enclosing casing and is rigidly supported in this base. The sleeve 80 rests upon a suitable ball or rotating bearing 83 mounted on the base 82. Fixed to the top of the sleeve 80 is a spider 84 which carries the bottle clamping heads, one for each of the platforms 77. Each of these heads comprises a throat 85 having a washer 86 therein adapted to clamp down upon a bottle after the same has been delivered to the supporting platform 77. This throat 85 is threaded on the bottom end of a vertical stem 87 which stem extends through a sleeve 88 in turn projecting through an annular boss 89 on the spider 84. The spindle 87, at its upper end, has an annular flange 90 on which is screw-threaded a cup 91 adapted to engage over a flange 92 on a second spindle 93 telescoping the spindle 87. This second spindle 93 is connected in a head 94 carrying a roller 95. The roller 95 is adapted to engage a cam 96 on a spider 97 non-rotatably mounted at the top of the vertical shaft 81 so that as the spindle 84 rotates and with it the clamping heads, the bells 85 will be vertically moved into and out of engagement with the bottles which are deposited on the rotating platforms 77. Interposed between the upper race of a roller bearing 98 bearing upon the bell top 85 and an annular flange 99 on the sleeve 88 is a coiled spring 100 which maintains the sleeve in position in the boss 89 and due to the roller bearing, the bell mouth 85 may rotate freely without affecting this coiled spring.

As has heretofore been explained, each of the platforms 77 is mounted on a spindle 78 rotatably supported on the disc 79. The lower end of each of these spindles has keyed thereon a driven cone 101. While this cone 101 is keyed on the spindle 78, it also has a slight vertical movement thereon so that the cone may be moved vertically independently of the spindle. The cone is biased toward its lowest position by a coiled spring 102 which is interposed between the hub of the cone and the race of a ball bearing 103. For moving the cone vertically, I provide a brake disc 104 mounted on a standard 105 having a guide pin 106 operating in the hollow spindle 78 and interposed between the spindle and the guide pin is a coiled spring 107 which biases the brake disc 104 downwardly. This stem 105 carries a roller 108 adapted to bear upon a cam 109 mounted on the table section 110 and so disposed that it will raise the brake disc and with it the cone 101 at the point where it is desired to release the bottle for delivery into the agitating portion of the machine. Each one of these cones 101 is driven by frictional engagement with a driving cone 111 in turn rotatably mounted on the sleeve 80. This driving cone 111 is driven by an electric motor 112 having a belt drive 113 with a pulley mounted on the lower end of the spindle 114 vertically supported in the housing section 111 and carrying at its upper end a gear 115 meshing with a gear 116 rotatably fixed to the hub of the cone 111. Therefore, the cone 111 is continuously driven and as the supporting disc 79 rotates to place the rotating bottle support 77 in position when, after the supports have received the bottle and the same has been clamped thereon, the driven cone 101 is lowered into frictional engagement with the driving cone 111, the bottle is rapidly rotated on its vertical axis at the same time that it is being moved from its receiving position to its delivery position. As soon, however, as the bottle has reached its delivery position, the cam 109 operating on the roller 108 will move the brake disc 104 vertically into engagement with the driven cone 101 thus disengaging the cone from the driving cone 111 and at the same time braking the driven cone to a stop. The spinner mechanism thus described is disposed adjacent an infeed star 59' and an outfeed star 60' similar to the infeed and outfeed stars 59 and 60 heretofore described with respect to the structure illustrated in Figs. 1 and 2 and which receive the bottle from a suitable conveyor disposed along the side of the machine. Interposed between the spinner mechanism and the agitator mechanism are a pair of transfer stars 117 and 118 adapted to respectively receive the bottles or containers from the spinner mechanism and deliver the same to the agitating mechanism and to receive the containers from the agitating mechanism and again deliver the same to the spinner mechanism from whence they are transferred by the outfeed star 60' to the conveyor mechanism disposed adjacent the machine. To the end that the various parts shall be rotated in synchronism, I provide on the shaft portion 4 of the spider head 5, a driving gear 66. This gear is adapted to mesh with a gear 119 which meshes with gear 120 in turn meshing with gears 121 and 122 respectively on the shafts of the stars 117 and 118 so that these stars will be rotated in unison and from the driving gear 119. This gear 120 in turn meshes with and drives a gear 120' on the shaft of which is a gear 120'' meshing with a gear 123 keyed on the sleeve 30 so that this sleeve will be rotated with the stars 117 and 118. The gear 120' meshes with a gear 124 in turn meshing with and driving a gear 125 for the outfeed star 60' and this outfeed star drives the infeed star through a gear 126 which in turn meshes with a gear 127 on the shaft of the infeed star 59'.

In operation, a bottle is received from the conveyor by the infeed star 59' and by this star, delivered to one of the spinning supports 77. Due to the fact that the driven cone 101 thereof is out of engagement with the cone 111, the platform 77 is stationary. At the time that the bottle is delivered to the platform 77 by the infeed star 59', the clamping bell 85 is lowered upon the top of the bottle, thereby securely clamping the bottle in position on the support 77. During this period, the rotating support is revolving and by the time the bottle is securely clamped thereon, the roller 108 has moved off of the cam 109 thereby engaging the driven cone with the driving cone and releasing the disc brake 104. This, of course, immediately starts the bottle to spinning on its vertical axis and this spinning action continues until the bottle and its platform has reached the point where it is to be taken by the transverse star 117. At this point, the cam 109 again raises the brake disc 104, disengaging the driven cone from the driving cone and bringing the spinning bottle to a stop. However, due to the fact that the bottle has been spun at a very high rate of speed during this speeding movement, and I have found that spinning the bottle from 1100 to 1500 R. P. M. is advantageous, the contents of the bottle which have been set in motion by this spinning action continue in their spinning movement. The transverse star 117 removes the bottle from its supporting platform 77 and delivers the same to one of the supporting platforms 19 of the agitator and the bottle then, as the supporting platform of the agitator rotates, is oscillated in the manner heretofore described with respect to the agitator until it has reached a position to be engaged by the transverse star 118, at which time it is, of course, released from the agitator and is again transferred to the spinner platform, by which it is again spun until it reaches the outfeed star 60' at which time the spinning action is stopped and the bottle is transferred from the spinner by the outfeed star 60' to the conveyor.

I claim as my invention:

1. An apparatus for mixing the contents of a container, the combination with a member moving in a fixed path, of means on said member for supporting a container and journalled on said member for oscillating movement thereon in a plane substantially transverse to the plane of movement of the member, a stationarily mounted irregular cam track, means carried by said member and engaging said cam track drivingly imparting an oscillating movement in both directions to said supporting means as a result of said relative movement between the cam track and member, and means interposed between said cam track engaging means and said supporting means for accelerating the speed of movement imparted thereto by the cam-engaging means.

2. An apparatus for mixing the contents of a container, the combination with a member moving in a fixed path, of means on said member for supporting a container and journalled on said member for oscillating movement thereon in a plane substantially transverse to the plane of movement of said member, a stationarily mounted irregular cam track, means carried by said member and engaging said cam track drivingly imparting an oscillating movement in both directions to said supporting means as a result of the relative movement between the cam track and member, and means interposed between said cam engaging means and said supporting means for multiplying the movement of said cam track engaging means in oscillating said supporting means.

3. An apparatus for mixing the contents of a container, the combination with a rotary member, of means on said member for supporting a container and journalled on said member for oscillating movement in a plane substantially radial with respect to the plane of movement of said member, a stationarily mounted irregularly shaped cam track, means carried by said member and engaging said cam track drivingly imparting an oscillating movement in both directions to said supporting means as a result of the relative movement between the cam track and the rotary member, means interposed between said cam track engaging means and said supporting means for accelerating the speed of movement imparted thereto by said cam track engaging means, and means for holding the supporting means stationarily during a portion of its movement.

4. An apparatus for mixing the contents of a container, the combination with a rotary member, of means on said member for supporting a container and journalled on said member to oscillate in a plane substantially radial with respect to the movement of said member, a stationarily mounted irregularly shaped cam track, means carried by said rotary member engaging said cam track drivingly imparting an oscillating movement in both directions to said supporting means as a result of the relative rotation between the cam track and rotary member, means interposed between said cam track engaging means and said supporting means for multiplying a movement imparted thereto by said cam track engaging means, and means for holding said supporting means stationarily during a portion of its movement.

5. An apparatus for mixing the contents of a container, the combination with a rotating member, of means on said member for supporting a container and journalled on said member for oscillating movement thereon in a plane substantially radial with respect to the plane of movement of said member, a stationarily mounted irregularly shaped cam track, means carried by said rotary member engaging said cam track drivingly imparting an oscillating movement in both directions to said supporting means as a result of the relative movement between said rotary member and the cam track, means interposed between said cam track engaging means and said supporting means for accelerating the speed of movement imparted thereto by said engaging means, means for holding the supporting means stationary during a portion of its movement, and means for delivering articles thereto and removing articles therefrom during the stationary period.

6. An apparatus for mixing the contents of a container, the combination with a rotary member, of means on said member for supporting a container and journalled on said member for oscillating movement thereon in a plane substantially radial with respect to the plane of the member, means for clamping a bottle on said supporting means carried by said rotary member, a stationarily mounted irregular cam track, means engaging said cam track drivingly imparting an oscillating movement in both directions to said supporting means as a result of the relative movement between said rotary member and the cam track, means interposed between said cam track engaging means and said supporting means for accelerating the speed of movement imparted thereto by said cam track engaging means, means for holding said support stationary during a portion of its movement, and means for releasing said clamping means while said supporting means is held stationary.

7. An apparatus for mixing the contents of a container, the combination with a rotary member, of means on said member for supporting a container and journalled on said member for oscillating movement thereon in a plane substantially radial with respect to the plane of movement of said member, a stationary cam track, a rocker arm mounted on said rotary member and drivingly oscillated by said cam track, and a gear connection between said supporting means and said rocker arm for imparting an oscillating movement to said supporting means during the rotation of said member.

8. An apparatus for mixing the contents of a container, the combination with a rotary member, of means on said member for supporting a container and journalled on said member for oscillating movement thereon in a plane substantially radial with respect to the plane of movement of said rotary member, a stationary cam track, a rocker arm mounted on said rotary member and having an oscillating movement drivingly imparted thereto by said cam track and a rack and gear connection between said rocker arm and said supporting means for imparting an oscillating movement to said supporting means as it is rotated with said rotary member.

9. An apparatus for mixing the contents of a container, the combination with a rotary member, of means on said member for supporting a container and journalled on said member for an oscillating movement in a plane substantially radial with respect to the plane of the movement of said member, a stationary cam track, a rocker arm mounted on said rotary member having a rack and gear drive connection with said supporting means, and a cam track engaging arm having a driving operating connection with said rocker arm.

10. An apparatus for mixing the contents of a container, the combination with a rotary member, of means on said member for supporting a container and journalled on said member for oscillating the movement in a plane substantially radial with respect to the plane of rotation of said member, a stationary cam, a rocker arm having a rack and gear drive connection with said bottle-supporting member, an operating lever adapted to engage said cam and a resilient connection between said rocker arm and said operating lever.

11. In an apparatus for mixing the contents of a container, the combination with a base, of a head rotatably mounted on said base, means upon said member to support a container and journalled thereon for oscillating movement in a plane radial to the plane of rotation of said support, a cam member supported on said base having a cam, means operated by said cam for repeatedly oscillating said support on its journal through a portion of its rotary movement, a second cam member removably mounted on said base having a cam for holding said supporting means stationary during a portion of its rotative movement, means for delivering a bottle to and means for removing a bottle from said supporting means while it is maintained in its stationary relationship.

12. In an apparatus for mixing the contents of a container, the combination with a base, of a rotary member mounted on said base, means for supporting a container on said rotary member journalled thereon for an oscillating movement in a plane radial to the plane of movement of said member, means for clamping a container on said supporting means, a cam member mounted on said base having a cam, means cooperating with said cam for oscillating said support through a portion of its rotary movement and permitting said support to remain stationary through the remainder of its rotary movement, means for delivering a container to and means for removing a container from said support during its stationary period, a second cam member having a cam for holding said support in its stationary position, means for removably securing said second cam member to said base, a third cam member having a cam for releasing said clamping means during the quiescent period of said support, and means for removably securing said third cam member in position upon said base.

13. In an apparatus for mixing the contents of a container, the combination with a rotary member, of a support journalled on said member for oscillation in a plane radial to the plane of rotation of said member, a cam stationarily mounted relative to said rotary member, and means for oscillating said supporting member comprising a gear journalled to rotate with said supporting member, an arm journalled on said rotary member having a rack at one end engaging said gear and having a pin-receiving recess at the opposite end, a cam engaging arm journalled on said member having a pin adapted to enter the recess on said first-mentioned arm, a resilient link for said pin-receiving recess and a roller on said second-mentioned arm adapted to engage said cam.

14. In a beverage mixing machine, the combination with means for revolving a filled container in an orbit, of means for rotating the container on its own axis during the revolving movement thereof to rotate the contents of the container, means for revolving the bottle in a second orbit, and means for swinging the container in a vertical plane during its movement in said orbit and while the contents are still rotating on the container axis.

15. In a beverage mixing machine, the combination with means for revolving the container in an orbit, of means for rotating the container on its axis during said revolution to rotate the contents thereof, means for revolving the container in a second orbit and means for swinging the container radially relatively to its orbital plane while the contents of the bottle is still rotating.

16. In a beverage mixing machine, the combination with means for continuously revolving filled containers in an orbit, of means for rotating the containers on their axes during said revolution to rotate the contents thereof, means for revolving the containers about a second orbit, means for moving the bottles in a vertical plane during said revolution, and means for transferring the bottles from said first revolving means to said second revolving means while the contents of the bottle is still rotating.

17. An apparatus for mixing the contents of a container, comprising a rotary member, a rotary supporting element carried by said rotary member, means for supporting a filled container on said element to rotate with its axis coincident with the axis of said element, means for rotating said element during the rotation of said member to rotate the contents of the container, a second rotary member, a container supporting element mounted to move on said second rotary member in a plane radial to said rotary member, and means for transferring the filled container from said first supporting element to said second supporting element while the contents of the container is still in motion.

18. An apparatus for mixing the contents of a container, comprising a rotary member, a rotary container supporting element carried by said rotary member, means for supporting a filled container on said element to rotate with its axis coincident with the axis of said element, means to rotate said element on said rotary member to rotate the contents of the container, a second rotary member, a container supporting element mounted to move in a vertical plane on said second rotary member, and means for transferring the filled container from said first supporting element to said second supporting element while the contents of the container is still in motion.

19. An apparatus for mixing the contents of a container, comprising a rotary member, a rotary container supporting element carried by said rotary member, means for supporting a filled container on said element to rotate with its axis coincident with the axis of said element, means to rotate said element on said rotary member to rotate the contents of a container, a second rotary member, a container supporting element mounted to move on said second rotary member to tilt and upright a container supported thereby, and means for transferring the filled container from said first supporting element to said second supporting element while the contents of the container is still in motion.

20. An apparatus for mixing the contents of a container comprising a rotary member, a container supporting element carried thereby comprising an axially rotatable container supporting table, a clamping member mounted to rotate on its axis and engage the top of the container and clamp the same in position on said table, a driven wheel drivingly connected to said table and a driving wheel rotatable coaxially with said rotary member and adapted to drivingly engage said driven wheel for imparting axial rotative movement to the container supported on said table.

21. An apparatus for mixing the contents of a container comprising a rotary member, a container supporting element carried thereby comprising an axially rotatable container supporting table, a clamping member mounted to rotate on its axis and engage the top of the container and clamp the same in position on said table, a driven wheel drivingly connected with said table, a driving wheel rotatable coaxially with said rotary member, and means for moving said driving and driven wheels into and out of driving engagement during the rotary movement of the rotary member for imparting an axial rotative movement to the container supported on said table.

22. An apparatus for mixing the contents of a container comprising a rotary member, a container supporting element carried thereby comprising an axially rotatable container supporting table, a clamping member mounted to rotate on its axis and engage the top of the container and clamp the same in position on said table, a driven wheel drivingly connected with said table, a driving wheel rotatable coaxially with said rotary member and adapted to drivingly engage the driven wheel for imparting an axial rotative movement to the container supported on said table, means for driving said rotary member, and means for driving the driving wheel independently of the driving means for the rotary member.

JAMES KANTOR.